United States Patent

Inoue

[11] Patent Number: 5,907,723
[45] Date of Patent: May 25, 1999

[54] APPARATUS HAVING LINE-OF-SIGHT DETECTING DEVICE

[75] Inventor: Koji Inoue, Kawasaki, Japan

[73] Assignee: Canon Kabushiki Kaisha, Tokyo, Japan

[21] Appl. No.: 08/934,318

[22] Filed: Sep. 19, 1997

[30] Foreign Application Priority Data

Sep. 30, 1996 [JP] Japan .................................... 8-259062

[51] Int. Cl.⁶ ...................................................... G03B 3/00
[52] U.S. Cl. .............................................. 396/51; 396/287
[58] Field of Search ...................................... 396/51, 287

[56] References Cited

U.S. PATENT DOCUMENTS 5,239,337 8/1993 Takagi et al. ............................. 396/51
5,245,381 9/1993 Takagi et al. ........................... 396/287
5,581,323 12/1996 Suzuki et al. ............................ 396/51
5,758,201 5/1998 Watanabe et al. ........................ 396/51

*Primary Examiner*—Russell Adams
*Attorney, Agent, or Firm*—Robin, Biecker & Daley

[57] ABSTRACT

In a camera having a line-of-sight detecting device for continuously detecting line-of-sight information which is information on a line of sight of a user of the camera, a predetermined action is performed when the user is determined on the basis of the detected line-of-sight information to be looking at a specific visual mark, wherein, until the line-of-sight information varies after the predetermined action is performed for the first time, the predetermined action for the second time is inhibited from being performed.

19 Claims, 6 Drawing Sheets

F I G. 7(a)　　F I G. 7(b)　　F I G. 7(c)
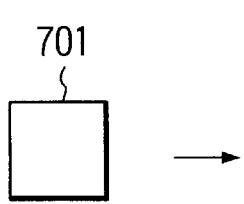 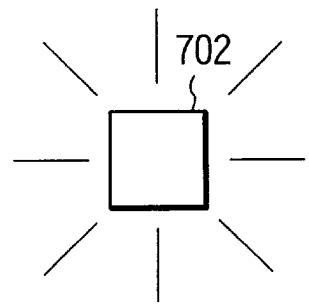 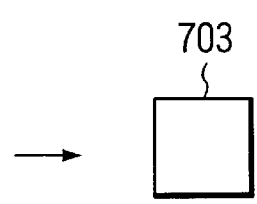

APPARATUS HAVING LINE-OF-SIGHT DETECTING DEVICE

BACKGROUND OF THE INVENTION

1. Field of the Invention

This invention relates to an optical apparatus having a line-of-sight detecting device arranged to detect a line of sight of the user of the apparatus, and more particularly to an optical apparatus having the function of starting a predetermined action on the basis of data relative to the detected line of sight of the user.

2. Description of Related Art

Among optical apparatuses having such a kind of line-of-sight detecting device, there is a known one, as disclosed in U.S. Pat. No. 4,109,145, which is arranged to time-serially detect the position of a line of sight of the user obtained within a viewfinder and, upon detecting that the line of sight has stayed at a specific index (visual mark) for a predetermined period of time or longer, start a function corresponding to the specific index.

Further, in an apparatus disclosed in WO 87/07479, the inside of a screen is divided into a plurality of areas, in which indexes corresponding to information of various kinds are respectively displayed in the form of symbols or words, and, upon detecting that a line of sight of the user has stayed at a specific index for a predetermined period of time or longer, a function which corresponds to the specific index is started. Thus, an index and a function are in a one-to-one correspondence.

During recent years, there have been proposed cameras capable of changing over the size of a photo-taking image plane by using a so-called line-of-sight input, i.e., an input indicating a stay of the line of sight of the user at a specific index. In such a camera, in response to the line-of-sight input to an index which is usually disposed on a liquid crystal display part within a viewfinder, the photo-taking image plane size is changed over, and the liquid crystal display part of the viewfinder is driven and controlled, according to the changed photo-taking image plane size, in such a way as to change also the size of an image plane display made on the liquid crystal display part of the viewfinder by masking and concealing all unnecessary parts of the image plane on the liquid crystal display part.

In cameras of the type using IX 240 film (Advanced Photo System™), the size of a photo-taking image plane is selectable from among three different image plane sizes, i.e., an image plane size having an aperture area of 15.6 mm×22.3 mm and called a classic size (hereinafter referred to as the C image plane size), an image plane size having an aperture area of 15.6 mm×27.4 mm and called a high definition size (hereinafter referred to as the H image plane size), and an image plane size having an aperture area of 9.6 mm×27.4 mm and called a panorama size (hereinafter referred to as the P image plane size).

However, the conventional arrangement for time-serially detecting the position of the line of sight as mentioned above has presented the following problem. Even after the user has looked at an index disposed within a viewfinder and a predetermined action corresponding to the index has been performed, if the user further continues to look at the index, the same action corresponding to the index would unnecessary be performed once again.

For example, with the user wishing to have a change-over (or selecting) action on the C, H and P image plane sizes, in changing the image plane size by the user looking at a predetermined index disposed on the liquid crystal display part within the viewfinder, if the user happens to further continue to look or gaze at the predetermined index after the change-over (switching) of the image plane size is effected, the image plane size selected then would be switched to the next image plane size, since it is determined that the switching of the image plane size has been requested.

Therefore, since the switching of the image plane size is repeatedly performed if the user continues to gaze at the predetermined index, it would become impossible to switch the image plane size over to a size desired by the user.

In setting and canceling a photo-taking mode or photo-taking conditions of the camera by using the line-of-sight input, the process of setting and that of canceling likewise continuously change from one over to another. The mode and conditions are, therefore, also difficult to set and cancel as desired, like in selecting the image plane size.

Further, in a case where a line of sight of the user passes around an index, there arises another problem that a function corresponding to the index tends to be performed since it is determined by mistake that the user is looking at the index. More specifically, in changing over the image plane size by the user looking at an index provided on the liquid crystal display part within the viewfinder, if the line of sight of the user passes around the index, the image plane size would be changed over every time the line of sight is detected. Under such a condition, the image plane size tends to be changed over to a size which is not desired by the user.

BRIEF SUMMARY OF THE INVENTION

In accordance with one aspect of the invention, there is provided an apparatus for performing a predetermined action when it is determined on the basis of line-of-sight information that a user of the apparatus is looking at a specific visual mark, wherein, until the line-of-sight information varies after the predetermined action is performed for the first time, the predetermined action for the second time is inhibited from being performed, so that the predetermined action can be prevented from being continuously performed even when the user of the apparatus is continuously looking at the specific visual mark.

The above and other aspects and features of the invention will become apparent from the following detailed description of embodiments thereof taken in conjunction with the accompanying drawings.

BRIEF DESCRIPTION OF THE SEVERAL VIEWS OF THE DRAWING

FIGS. 7(a), 7(b) and 7(c) respectively show how the state of an index varies in the second embodiment.

DETAILED DESCRIPTION OF THE INVENTION

Hereinafter, preferred embodiments of the invention will be described in detail with reference to the drawings.

Figure 1:
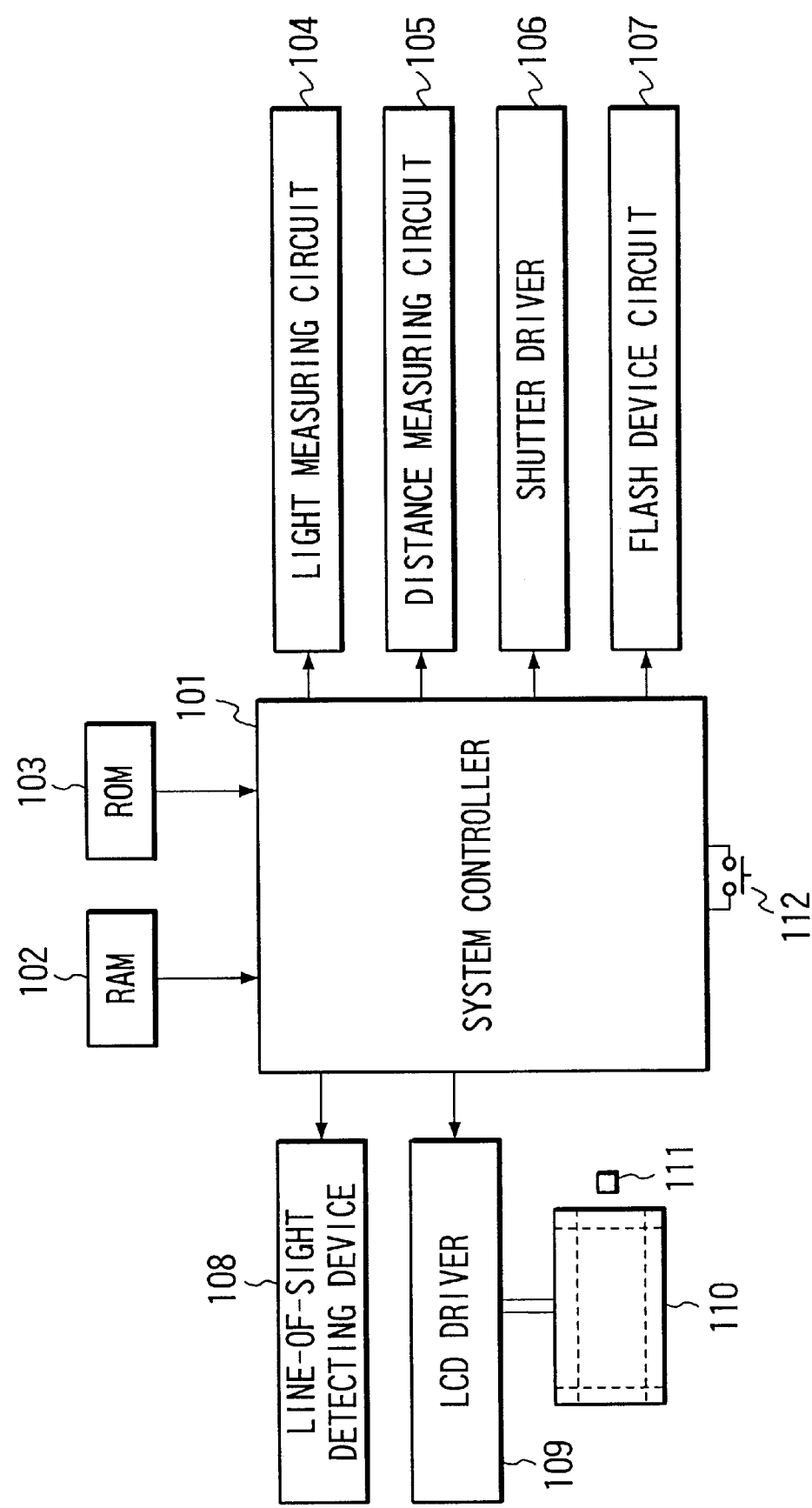
FIG. 1 is a block diagram showing the entire arrangement of a camera to which the invention is applied as a first embodiment thereof.

FIG. 1 is a block diagram showing the entire arrangement of a camera to which the invention is applied as a first embodiment thereof.

Referring to FIG. 1, a system controller 101 is arranged to perform sequence control and computing operations as control means. A RAM 102 is arranged to store data. A ROM 103 is arranged to store programs and data. A light measuring circuit 104 is arranged to measure the quantity of light of an object to be photographed. A distance measuring circuit 105 is arranged to measure a distance to the object. A shutter driver 106 is arranged to drive a shutter for an exposure of a film. The camera further includes a flash device circuit 107.

A line-of-sight detecting device 108 is arranged to detect a line of sight of the user. An LCD (liquid crystal display) driver 109 is arranged to drive a liquid crystal display part 110, which is of a transmission type and is disposed within a viewfinder. An index (visual mark) 111 is provided for switching C, H and P photo-taking image plane sizes from one over to another according to a line-of-sight input (an input of the line of sight of the user). A shutter release switch 112 is provided for instructing the camera to perform an exposure action on the film.

Figure 2:
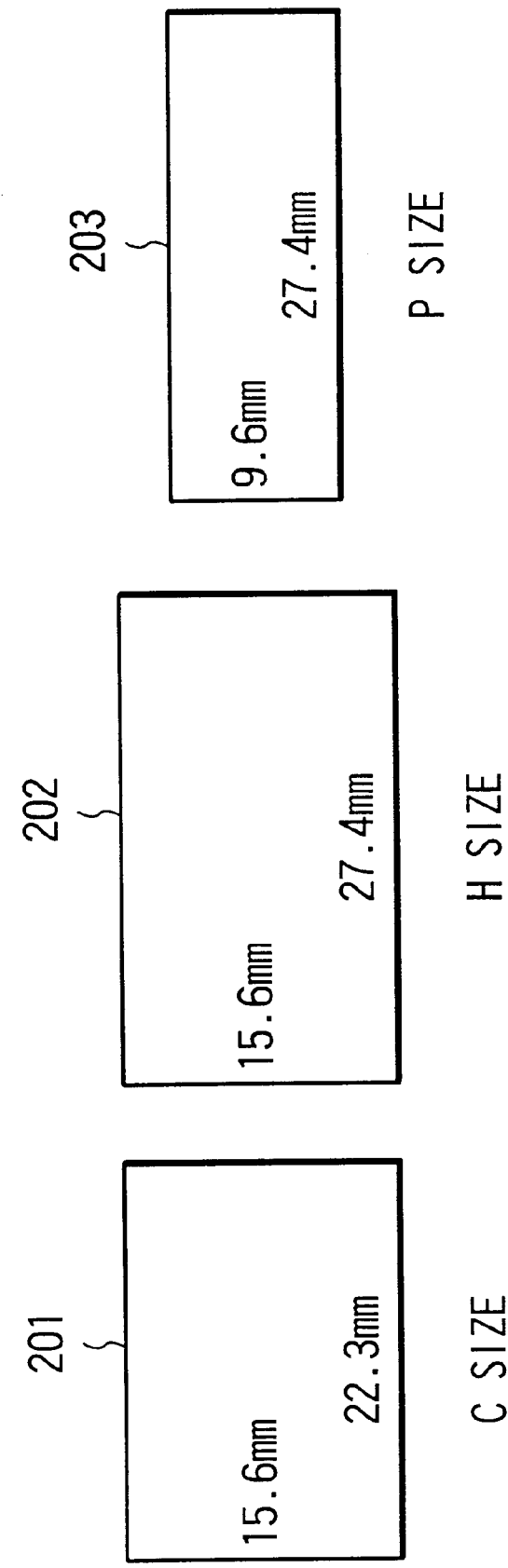
FIGS. 2(a), 2(b) and 2(c) respectively show C, H and P image plane sizes selectable in the camera shown in FIG. 1.

FIGS. 2(a), 2(b) and 2(c) respectively show the C, H and P image plane sizes. In FIG. 2(a), an image plane size 201 represents the C (classic) image plane size. In FIG. 2(b), an image plane size 202 represents the H (high definition) image plane size. In FIG. 2(c), an image plane size 203 represents the P (panorama) image plane size. Incidentally, numerical values shown in FIGS. 2(a), 2(b) and 2(c) indicate dimensions in an aperture area of the camera.

Figure 3:
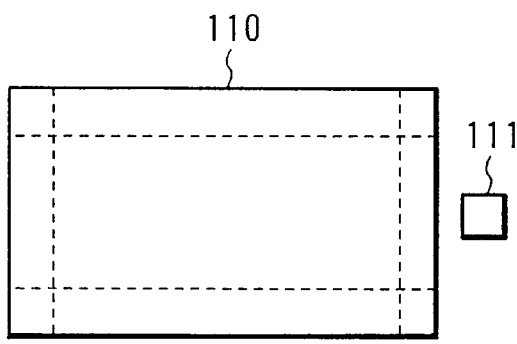
FIG. 3 shows an index (visual mark) provided for selection of the C, H or P image plane size and a liquid crystal display part provided for providing an image plane display within a viewfinder of the camera shown in FIG. 1.

FIG. 3 shows an appearance of the inside of the viewfinder of the camera. Inside the viewfinder, there is disposed the liquid crystal display part 110. Normally, the liquid crystal display part 110 provides an image plane display corresponding to the H image plane size. By masking top and bottom portions or right and left portions of the liquid crystal display part 110 from outer edges up to broken lines in FIG. 3, an image plane display corresponding to the P image plane size or the C image plane size is provided. In proximity to the liquid crystal display part 110, there is disposed the index 111, which is arranged to be used for switching the C, H and P image plane sizes from one over to another according to the line of sight of the user. Every time the user looks at the index 111, the photo-taking image plane changes from the C image plane size to the H image plane size, from the H image plane size to the P image plane size, and from the P image plane size to the C image plane size, in a cyclic switching manner.

Figure 4A:
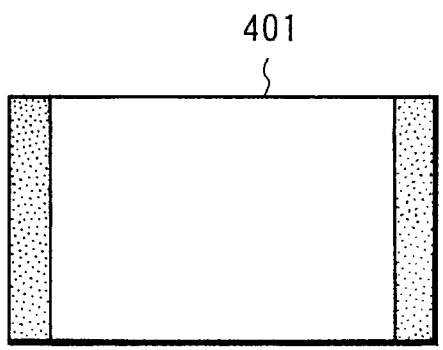
FIGS. 4(a) and 4(b) respectively show the display states of the liquid crystal display part obtained at the viewfinder shown in FIG. 3 with the C and P image plane sizes selected.
Figure 4B:
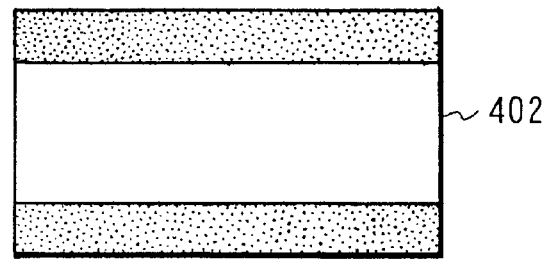

FIGS. 4(a) and 4(b) respectively show the masked states of the liquid crystal display part 110 disposed inside the viewfinder. In FIG. 4(a), reference numeral 401 denotes an image plane display which corresponds to the C image plane size and is obtained by masking the right and left side portions of the image plane display corresponding to the H image plane size. In FIG. 4(b), reference numeral 402 denotes another image plane display which corresponds to the P image plane size and is obtained by masking the top and bottom portions of the image plane display corresponding to the H image plane size.

Figure 5:
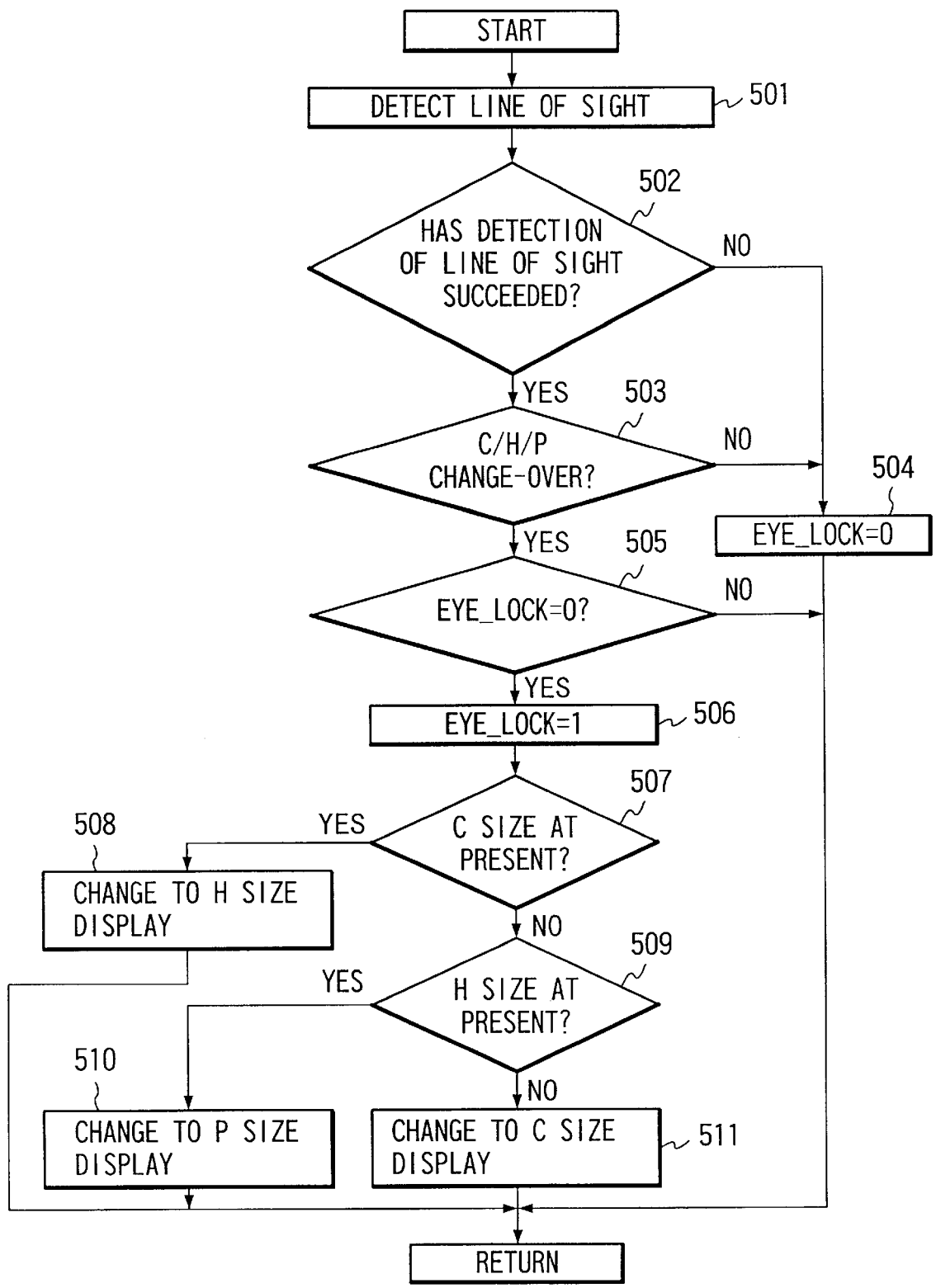
FIG. 5 is a flow chart showing the flow of an operation of a system controller in the first embodiment.

FIG. 5 is a flow chart showing the flow of an operation of the system controller 101 shown in FIG. 1. The system controller 101 operates as described below with reference to FIG. 5. The description covers only a case where the change-over of the C, H and P image plane sizes from one over to another is effected in response to the line-of-sight input.

When the program of this operation begins, the flow proceeds to a step 501. At the step 501, a line-of-sight detecting action is performed to detect a line of sight of the user by using the line-of-sight detecting device 108.

At a step 502, a check is made to find if the line-of-sight detecting action has been successfully performed. If so, the flow proceeds to a step 503. If not, the flow proceeds to a step 504.

At the step 503, with the line-of-sight detecting action found to have been successfully performed, a check is made for the position of the line of sight of the user. In this case, the check is made to find if the position of the line of sight coincides with the index 111 provided for the change-over (selection) of the C, H and P image plane sizes. If so, the flow proceeds to a step 505. If not, the flow proceeds to a step 504.

At the step 504, with the line-of-sight detecting action found either to have been in failure at the step 502 or to be not for the request for change-over of the C, H and P image plane sizes at the step 503, a flag EYE_LOCK, which is provided for restraining the change-over action on the photo-taking image plane sizes from being performed in response to the detection of the line of sight, is cleared (EYE_LOCK=0). Therefore, the change-over of the C, H and P photo-taking image plane sizes in response to the detection of the line of sight becomes acceptable for the next time.

At the step 505, with the line-of-sight detection found at the step 503 to have been made for change-over of the C, H and P photo-taking image plane sizes, a check is made for the state of the flag EYE_LOCK. If the flag EYE_LOCK is found to be cleared (EYE_LOCK=0), i.e., not to be set for restraining the change-over of the C, H and P photo-taking image plane sizes, the flow proceeds to a step 506. If the flag EYE_LOCK is found to be set for restraining the change-over of the C, H and P photo-taking image plane sizes, the flow comes to an end.

At the step 506, with the flag EYE_LOCK found at the step 505 not to be set for restraining the change-over of the C, H and P photo-taking image plane sizes, and with the change-over of the C, H and P photo-taking image plane sizes required by the line-of-sight detection, the flag EYE_LOCK is set for restraining the change-over of the C, H and P photo-taking image plane sizes (EYE_LOCK=1).

At a step 507, a check is made to find if the liquid crystal display part 110 disposed inside the viewfinder is currently providing an image plane display corresponding to the C image plane size. If so, the flow proceeds to a step 508. If not, the flow proceeds to a step 509.

At the step 508, since an instruction has been given for the change-over of the photo-taking image plane sizes and the image plane display corresponding to the C image plane size is found at the step 507 to be currently provided, the photo-taking image plane size is changed over to the next size, i.e., the H image plane size, and the image plane display is also changed over to the display corresponding to the H image plane size.

At the step 509, with the liquid crystal display part 110 found at the step 507 not to be currently providing the display corresponding to the C image plane size, a check is made to find if the display corresponding to the H image plane size is currently provided. If so, the flow proceeds to a step 510. If not, the flow proceeds to a step 511.

At the step 510, with the display corresponding to the H image plane size found at the step 509 to be currently provided, the photo-taking image plane size is changed over to the next image plane size, i.e., the P image plane size, and the image plane display is also changed over to the display corresponding to the P image plane size.

At the step 511, with the display corresponding to the C image plane size found at the step 507 to be not currently provided and with the display corresponding to the H image plane size found at the step 509 to be also not currently provided, i.e., with the display corresponding to the P image plane size found to be currently provided, the photo-taking image plane size is changed over to the next image plane size, i.e., the C image plane size, and the image plane display is also changed over to the display corresponding to the C image plane size.

In the case of the first embodiment described above, a step of setting the flag EYE_LOCK (EYE_LOCK=1) for restraining the change-over of the image plane sizes is executed prior to changing over the image plane sizes. The change-over action on the photo-taking image plane sizes is thus inhibited until the flag EYE_LOCK is cleared to "0" (EYE_LOCK=0). Therefore, when the user is continuously looking at the index 111 after one photo-taking image plane size has been changed over to another size, the loop of step 502→step 503→step 505→ "return" is repeated. Accordingly, even when the user is continuously looking at the index 111, the photo-taking image plane size never continuously changes from one over to another.

Further, in cases where it has become impossible to detect the line-of-sight as the eye of the user has been detached temporarily from the viewfinder, or where the change-over of the C, H and P image plane sizes is not to be effected as the user has ceased to look at the index 111, the flag EYE_LOCK is cleared (EYE_LOCK=0), thereby enabling the change-over action on the photo-taking image plane sizes to be newly performed.

Figure 6:
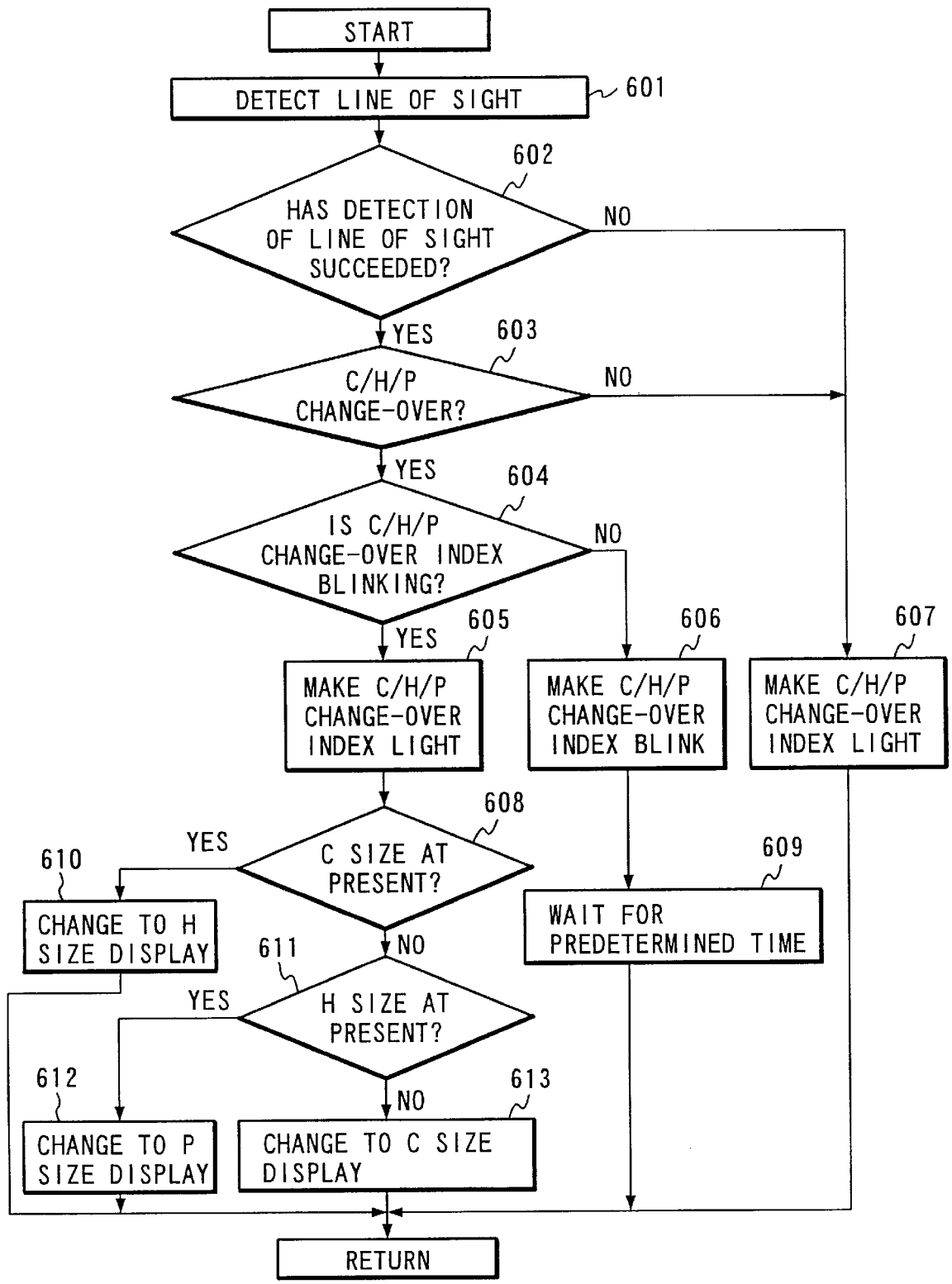
FIG. 6 is a flow chart showing the flow of an operation of a system controller of a second embodiment of the invention.

FIG. 6 and FIGS. 7(*a*), 7(*b*) and 7(*c*) relate to a second embodiment of the invention.

The second embodiment is arranged in the same manner as the first embodiment with the exception that the system controller 101 in the second embodiment is arranged to operate in accordance with procedures shown in FIG. 6 which is a flow chart.

FIG. 7(*a*) shows the index 111, which is provided for effecting the change-over (selection) of the C, H and P image plane sizes, in a lighted-up state 701. FIG. 7(*b*) shows the index 111 in a blinking state 702. The blinking state 702 of the index 111 indicates a standby state of waiting for the line-of-sight input, i.e., waiting for the user to look at the index 111. More specifically, the index 111 blinks for a predetermined period of time after having been looked at by the user for the first time, and this blinking state indicates receipt of the line-of-sight input for the first time and, at the same time, indicates a state of waiting for receipt of the line-of-sight input for the second time. FIG. 7(*c*) shows the index 111 in a lighted-up state 703, which indicates that the line-of-sight input for the second time has been received.

Here, only an operation of the second embodiment related to the change-over (selection) of the C, H and P photo-taking image plane sizes to be made by using a line of sight of the user will be described with reference to the flow chart of FIG. 6.

When the program of the operation begins, the flow of operation proceeds to a step 601. At the step 601, a line-of-sight detecting action is performed to detect a line of sight of the user by using the line-of-sight detecting device 108.

At a step 602, a check is made to find if the line-of-sight detecting action has been successfully performed. If so, the flow proceeds to a step 603. If not, the flow proceeds to a step 607.

At the step 603, with the line-of-sight detecting action found to have been successfully performed, a check is made for the position of the detected line of sight. In this case, the check is made to find if the index 111 provided within the viewfinder for the change-over of the C, H and P image plane sizes has been looked at by the user. If so, the flow proceeds to a step 604. If not, the flow proceeds to the step 607.

At the step 604, a check is made to find if the index 111 provided for change-over of the C, H and P image plane sizes is currently blinking. The blinking state of the index 111 as shown in FIG. 7(*b*) continues until the line-of-sight input for the second time is determined after the lapse of a predetermined period of time after receipt of the line-of-sight input for the first time for the change-over of the C, H and P image plane sizes. If the index 111 is found to be currently blinking, the flow of operation proceeds to a step 605. If not, the flow proceeds to a step 606.

At the step 605, the index 111 provided for change-over (selection) of the C, H and P image plane sizes is lighted up. In this instance, since it is determined that the index 111 has been looked at again by the user after the lapse of the predetermined period of time set at a step 609 with the index 111 in the blinking state, the index 111 is lighted up.

At the step 606, the index 111 for change-over of the C, H and P image plane sizes is caused to blink. In this instance, the index 111 is caused to blink when the index 111 has been looked at while the index 111 is in the state of being lighted up. The flow then proceeds to the step 609.

At the step 607, the index 111 is lighted up in cases where the line-of-sight detection has not been successfully made or where the index 111 has not been looked at. Then, the flow is brought to an end.

At a step 608 after the step 605, a check is made to find if the liquid crystal display part 110 disposed inside the viewfinder is currently providing an image plane display corresponding to the C image plane size. If so, the flow proceeds to a step 610. If not, the flow proceeds to a step 611.

At the step 609, after the index 111 is caused to blink at the step 606 when the index 111 has been looked at with the index 111 in the lighted-up state, the flow waits for the predetermined period of time and, then, comes to an end.

At the step 610, with the display corresponding to the C image plane size found at the step 608 to be currently provided, the photo-taking image plane size is changed over to the next size, i.e., the H image plane size, and the image plane display is also changed over to the display corresponding to the H image plane size.

At the step 611, a check is made to find if the display corresponding to the H image plane size is currently provided. If so, the flow of operation proceeds to a step 612. If not, the flow proceeds to a step 613.

At the step 612, with the display corresponding to the H image plane size found at the step 611 to be currently provided, the photo-taking image plane size is changed over to the next image plane size, i.e., the P image plane size, and the image plane display is also changed over to the display corresponding to the P image plane size.

At the step 613, with the display corresponding to the C image plane size found at the step 608 to be not currently provided and with the display corresponding to the H image plane size found at the step 611 to be also not currently provided, i.e., with the display corresponding to the P image plane size found to be currently provided, the photo-taking image plane size is changed over to the next image plane size, i.e., the C image plane size, and the image plane display is also changed over to the display corresponding to the C image plane size.

While the first and second embodiments are arranged by way of example, as described above, to change or switch the photo-taking image plane size from one size over to another by using an index provided inside the viewfinder, the change-over arrangement according to the invention is of course not limited to what is disclosed above but is applicable also to change-over of photo-taking conditions or photo-taking modes, setting a flash device to emit light or not to emit light, and to zooming actions, etc.

I claim:

1. An apparatus comprising:
    line-of-sight detecting means for continuously detecting line-of-sight information which is information on a line of sight of a user of said apparatus;
    determining means for determining, on the basis of the line-of-sight information detected by said line-of-sight detecting means, whether the user is looking at a specific visual mark; and
    executing means for executing a predetermined action when the user is determined by said determining means to be looking at said specific visual mark, wherein, until the line-of-sight information varies after the predetermined action is executed for the first time, said executing means inhibits the predetermined action for the second time from being executed.

2. An apparatus according to claim 1, wherein, until it is determined that the user is not looking at said specific visual mark after the predetermined action is executed for the first time, said executing means inhibits the predetermined action for the second time from being executed.

3. An apparatus according to claim 1, wherein, until it becomes impossible to detect the line-of-sight information of the user after the predetermined action is executed for the first time, said executing means inhibits the predetermined action for the second time from being executed.

4. An apparatus according to claim 1, wherein the predetermined action is a setting action of a condition to be effected in a cyclic switching manner.

5. An apparatus according to claim 1, wherein said apparatus is a camera, and the predetermined action is a setting action of a photographing condition.

6. An apparatus according to claim 5, wherein the predetermined action is a switching action for size of an image formed field.

7. An apparatus comprising:
    line-of-sight detecting means for continuously detecting line-of-sight information which is information on a line of sight of a user of said apparatus;
    determining means for determining, on the basis of the line-of-sight information detected by said line-of-sight detecting means, whether the user is looking at a specific visual mark; and
    executing means for executing a predetermined action when a state in which the user is determined by said determining means to be not looking at said specific visual mark changes to a state in which the user is determined by said determining means to be looking at said specific visual mark, wherein said executing means does not newly execute the predetermined action when the state in which the user is determined by said determining means to be looking at said specific visual mark continues.

8. An apparatus according to claim 7, wherein the predetermined action is a setting action of a condition to be effected in a cyclic switching manner.

9. An apparatus according to claim 7, wherein said apparatus is a camera, and the predetermined action is a setting action of a photographing condition.

10. An apparatus according to claim 9, wherein the predetermined action is a switching action for size of an image formed field.

11. An apparatus comprising:
    line-of-sight detecting means for continuously detecting line-of-sight information which is information on a line of sight of a user of said apparatus;
    determining means for determining, on the basis of the line-of-sight information detected by said line-of-sight detecting means, whether the user is looking at a specific visual mark;
    display varying means for varying an indication mode of said specific visual mark when the user is determined by said determining means to be looking at said specific visual mark; and
    executing means for executing a predetermined action when the user is determined by said determining means to be looking at said specific visual mark after the indication mode of said specific visual mark has been varied by said display varying means, wherein, every time said executing means executes the predetermined action once, said executing means brings the indication mode of said specific visual mark back to a mode obtained before being varied by said display varying means.

12. An apparatus according to claim 11, wherein the predetermined action is a setting action of a condition to be effected in a cyclic switching manner.

13. An apparatus according to claim 11, wherein said apparatus is a camera, and the predetermined action is a setting action of a photographing condition.

14. An apparatus according to claim 13, wherein the predetermined action is a switching action for size of an image formed field.

15. An apparatus arranged to execute a predetermined action in response to detection of a line of sight of a user of said apparatus, comprising:
    line-of-sight detecting means for continuously detecting line-of-sight information which is information on the line of sight of the user of said apparatus;
    determining means for determining, on the basis of the line-of-sight information detected by said line-of-sight detecting means, whether the user is looking at a specific visual mark;
    setting means for, when the user is determined by said determining means to be looking at said specific visual mark, setting the predetermined action acceptable and notifying the user that the predetermined action has been set acceptable; and
    executing means for executing the predetermined action when the user is determined by said determining means to be looking at said specific visual mark after the predetermined action has been set acceptable by said setting means, wherein, every time said executing means executes the predetermined action once, said executing means cancels the setting by said setting means.

16. An apparatus according to claim 15, wherein the predetermined action is a setting action of a condition to be effected in a cyclic switching manner.

17. An apparatus according to claim 15, wherein said apparatus is a camera, and the predetermined action is a setting action of a photographing condition.

18. An apparatus according to claim 17, wherein the predetermined action is a switching action for size of an image formed field.

19. An apparatus comprising:

line-of-sight detecting means for detecting line-of-sight information which is information on a line of sight of a user of said apparatus;

determining means for determining, on the basis of the line-of-sight information detected by said line-of-sight detecting means, whether the user is looking at a specific visual mark and generating output signals whenever the user is looking at said specific visual mark; and executing means for receiving said output signals and for executing a predetermined action responsively to the receipt of one and not others of said received signals.

* * * * *